United States Patent
Barde et al.

(10) Patent No.: US 11,489,157 B2
(45) Date of Patent: Nov. 1, 2022

(54) ONE-DIMENSIONAL STRUCTURE PRE-CALCIATED MATERIALS AS POSITIVE ELECTRODE FOR RECHARGEABLE CALCIUM BATTERIES AND CELL COMPRISING THE SAME

(71) Applicants: TOYOTA MOTOR EUROPE, Brussels (BE); AGENCIA ESTATAL CONSEJO SUPERIOR DE INVESTIGACIONES CIENTIFICAS, Madrid (ES)

(72) Inventors: Fanny Barde, Brussels (BE); Maria Rosa Palacin, Madrid (ES); Deyana Stoytcheva, Madrid (ES); Alexandre Ponrouch, Madrid (ES); Carlos Frontera, Madrid (ES)

(73) Assignees: TOYOTA MOTOR EUROPE, Brussels (BE); AGENCIA ESTATAL CONSEJO SUPERIOR DE INVESTIGACIONES CIENTIFICAS, Madrid (ES)

(*) Notice: Subject to any disclaimer, the term of this patent is extended or adjusted under 35 U.S.C. 154(b) by 227 days.

(21) Appl. No.: 16/760,258

(22) PCT Filed: Jan. 8, 2018

(86) PCT No.: PCT/EP2018/050362
§ 371 (c)(1),
(2) Date: Apr. 29, 2020

(87) PCT Pub. No.: WO2019/096446
PCT Pub. Date: May 23, 2019

(65) Prior Publication Data
US 2020/0280068 A1    Sep. 3, 2020

(30) Foreign Application Priority Data
Nov. 16, 2017   (ES) .................. ES201700768

(51) Int. Cl.
*H01M 4/525* (2010.01)
*H01M 10/63* (2014.01)
(Continued)

(52) U.S. Cl.
CPC .......... *H01M 4/525* (2013.01); *H01M 4/381* (2013.01); *H01M 4/505* (2013.01);
(Continued)

(58) Field of Classification Search
CPC ...... H01M 4/525; H01M 4/381; H01M 4/505; H01M 10/63; H01M 10/054; H01M 10/0568; H01M 10/0569
See application file for complete search history.

(56) References Cited

U.S. PATENT DOCUMENTS

| | | | | |
|---|---|---|---|---|
| 2012/0258370 A1* | 10/2012 | Miyoshi | ........... | H01M 4/364 241/23 |
| 2013/0130103 A1* | 5/2013 | Kim | ........... | C01G 53/70 429/231.95 |
| 2015/0228965 A1* | 8/2015 | Ushiroda | ........... | C01B 33/26 252/182.1 |

FOREIGN PATENT DOCUMENTS

| | | |
|---|---|---|
| JP | 2000-149988 A | 5/2000 |
| JP | 2011-108540 A | 6/2011 |

(Continued)

OTHER PUBLICATIONS

Office Action dated Jul. 27, 2021 in Japanese Application No. 2020-526963.
(Continued)

*Primary Examiner* — Jimmy Vo
(74) *Attorney, Agent, or Firm* — Sughrue Mion, PLLC

(57) ABSTRACT

The present invention relates to a calcium-based secondary cell containing:
an electrolyte arranged between the negative electrode and the positive electrode and comprising a calcium
(Continued)

salt of a fluorine-containing anion of formula $(XF_n)^{m-}$ wherein n is a positive integer of at most 6 and m is a positive integer of at least 1 and m<n, a positive-electrode active material at the positive electrode which is a one-dimensional structure accommodating $Ca^{2+}$ ions and has the formula (1):

$$Ca_{n+2}Me1_{(n+1)-y-z}Me2_yMe3_zO_{3n+3} \quad (1)$$

wherein:
Me1, Me2, Me3 are different transition metals;
1≤n and n is not necessarily an integer;
0≤y and y is not necessarily an integer;
0≤z and z is not necessarily an integer.

19 Claims, 8 Drawing Sheets

(51) Int. Cl.
H01M 4/38 (2006.01)
H01M 4/505 (2010.01)
H01M 10/054 (2010.01)
H01M 10/0568 (2010.01)
H01M 10/0569 (2010.01)

(52) U.S. Cl.
CPC ..... *H01M 10/054* (2013.01); *H01M 10/0568* (2013.01); *H01M 10/0569* (2013.01); *H01M 10/63* (2015.04); *H01M 2300/0025* (2013.01)

(56) References Cited

FOREIGN PATENT DOCUMENTS

| JP | 2012-248470 A | 12/2012 | | |
|---|---|---|---|---|
| WO | 2016/050329 A1 | 4/2016 | | |
| WO | 2016/050331 A1 | 4/2016 | | |
| WO | WO-2016050331 A * | 4/2016 | .......... | H01M 10/054 |
| WO | 2017/097437 A1 | 6/2017 | | |

OTHER PUBLICATIONS

M.E. Arroyo-De Dompablo et al., "In quest of cathode materials for Ca ion batteries: the CaMO3 perovskites (M=Mo, Cr, Mn, Fe, Co, and Ni)", Physical Chemistry Chemical Physics., Jan. 1, 2016,p. 19966-19972, vol. 18, No. 29.

A. Jain et al., "Structural and magnetic properties of spin chain compounds Ca3Co2-xFexO6", Physical Review B 74, Nov. 1, 2006, pp. 174419-1-174419-11.

International Search Report for PCT/EP2018/050362, dated Apr. 23, 2018.

Written Opinion of the International Searching Authority PCT/ISA/237, dated Apr. 23, 2018.

\* cited by examiner

ONE-DIMENSIONAL STRUCTURE PRE-CALCIATED MATERIALS AS POSITIVE ELECTRODE FOR RECHARGEABLE CALCIUM BATTERIES AND CELL COMPRISING THE SAME

CROSS REFERENCE TO RELATED APPLICATIONS

This application is a National Stage of International Application No. PCT/EP2018/050362 filed Jan. 8, 2018, claiming priority based on Spanish Patent Application No. P201700768 filed Nov. 16, 2017.

FIELD OF INVENTION

The present invention relates to a calcium-based secondary cell comprising a positive electrode that includes a positive-electrode active material, said positive-electrode active material being capable of accepting and releasing calcium ions and having a particular chemical constitution. The invention also relates to a non-aqueous calcium-based secondary battery comprising such a calcium-based secondary cell, and to a vehicle, an electronic device, a robot, a wheelchair, an autonomous drone or a stationary power generating device comprising such a non-aqueous calcium-based secondary battery.

TECHNOLOGICAL BACKGROUND

Secondary (i.e. rechargeable) electrochemical cells and batteries are a power source widely used in information-related devices, communication devices (such as personal computers, camcorders and cellular phones) as well as in the automobile industry or in stationary power generating devices. Conventional lithium-based cells typically include a positive electrode (also referred to as "cathode") and a negative electrode (also referred to as "anode") whose active materials are capable of accepting and releasing lithium ions, as well as an electrolyte arranged between the electrodes and including lithium ions.

Calcium is much more abundant in nature than lithium and, despite the high atomic weight of Ca with respect to Li, the bivalent nature of Ca means that it could in principle provide a suitable rechargeable battery material, even if it has proven difficult so far to identify suitable chemistries and Ca batteries are very underdeveloped as compared to their Li counterparts.

Among problems associated with the preparation of Ca batteries in an industrial context, a first issue is that "commercial" Ca is less electro-active than the electroplated Ca metal. More concretely, electrodeposited Ca shows a lower stripping overpotential than pressed Ca disks. By starting on charge using a pre-calciated active material as the positive electrode material in a Ca-based battery, $Ca^{2+}$ will be first de-intercalated from the positive material and will be plated in situ on the negative electrode, creating an "in situ formed electroplated Ca metal", which presents a lower stripping overpotential, leading overall to an increase of full Ca-battery efficiency. Ultimately, in an ideal case with 100% columbic efficiency for Ca plating stripping, one could assemble cells without Ca on the anode side at the beginning and use the cheapest and lightest current collector possible (Al). This way, one would not have to worry about assembling the cells in a dry room or about a possible native passivation layer on the Ca anode.

Unfortunately, there are very few pre-calciated positive active materials which are electrochemically active. Further, it is difficult to find an electrolyte which is (1) compatible with the process of stripping/plating of calcium at the negative electrode and also (2) stable at high potential so that (de)intercalation of $Ca^{2+}$ at the positive electrode can take place. Electrolyte decomposition can occur during the charge process of the cathode for full Ca-battery cells.

A higher voltage than for previously reported Ca-based batteries is also desirable.

In Prior Art 1, M. Cabello et al., *Electrochemistry Communications*, 67 (2016), 59-64 ("Advancing towards a veritable calcium-ion battery: $CaCo_2O_4$ positive electrode material"), $CaCo_2O_4$ with a layered, two-dimensional structure is proposed as positive electrode material for a Ca-based battery using $V_2O_5$ as negative electrode. $CaClO_4$ in acetonitrile is used as electrolyte. The theoretical capacity of this battery is 241 mAh/g. The experimental capacity demonstrated was approximately 100 mAh/g-positive material, and the average full cell voltage was 0.9 V.

In Prior Art 2, Japanese patent application JP-2012-248470, $Ca_3Co_2O_6$ with column-like structure and $V_2O_5$ are proposed as positive and negative electrode materials for Ca-based battery, respectively. $Ca(TFSI)_2$ in DMSO or EC:PC is proposed as an electrolyte. The expected voltage is 3.2 V or 2.7 V.

Prior Art 3, Korean patent application KR-2015-0142786 describes a calcium secondary battery with a negative electrode containing $TiS_2$, a conductive agent and a binder capable of occluding/releasing calcium, a preferred binder being polyvinylidene fluoride (PVDF), and a preferred conductive material being a super-P. CaCoO is indicated as the positive electrode material, without an explanation of the crystallographic structure such a material might have.

In Prior Art 4, Arroyo-de Dompablo et al., *Chem. Mater.*, 2016, 28 (19), pp 6886-6893, "A Joint Computational and Experimental Evaluation of $CaMn_2O_4$ Polymorphs as Cathode Materials for Ca Ion Batteries", the three-dimensional material $CaMn_2O_4$ is used in a Ca battery using Ca metal as negative electrode and $Ca(BF_4)_2$ in EC:PC as electrolyte. Tests were carried out at 75° C.-100° C. Electrolyte decomposition is observed when one tries to charge the cell. $CaMn_2O_4$ is not electrochemically active in such conditions.

Prior Art 5, international patent application publication WO 2017/097437, relates to a Ca-based secondary battery comprising, as positive electrode active material, a molybdenum oxide-based material containing molybdenum in an oxidation state of 4 or more and 6 or less. The pre-calciated form $CaMoO_3$ is proposed. $CaMoO_3$ is studied further in Prior Art 6, Arroyo-de Dompablo et al., Phys. Chem. Chem. Phys., 2016, 18, 19966-19972, "In quest of cathode materials for Ca ion batteries: the $CaMO_3$ perovskites (M=Mo, Cr, Mn, Fe, Co, and Ni)". The three-dimensional material $CaMoO_3$ was used in a Ca battery using Ca metal as negative electrode and $Ca(BF_4)_2$ in EC:PC as electrolyte. Tests were carried out at 50° C.-75° C.

In Prior Art 7, the Ph.D. thesis of J. Rogosic entitled "*Towards the Development of Calcium Ion Batteries*" (MIT, 2014), $V_2O_5$, $FeS_2$ and $Mo_3Se_4$ Chevrel phases are reported as possible positive electrode materials. The Chevrel phase is reported as the most promising material. In such a case the initial de-intercalated material has a molar mass of 600.84 g/mol. Tests are performed in a cell with the following configuration: $CaHg_{11}$—CaHg/acetonitrile+$Ca(ClO_4)_2$/positive materials. The capacities (mAh/g-active positive material) achieved in this prior art are extremely low because the positive and negative materials reported have high molar weight. Also, non-environmentally friendly mercury is present in the battery. In addition, acetonitrile is highly flammable.

Prior Art 8, international patent application publication WO 2016/050331, describes a calcium-based secondary cell comprising a negative electrode that includes: a negative-electrode active material, said negative-electrode active material being capable of accepting and releasing calcium ions; a positive electrode that includes a positive-electrode active material, said positive-electrode active material being capable of accepting and releasing calcium ions; an electrolyte arranged between the negative electrode and the positive electrode, said electrolyte comprising calcium ions and an electrolyte medium, wherein the electrolyte is not solid at standard conditions and wherein the electrolyte medium includes a non-aqueous solvent; and a temperature control element.

SUMMARY OF THE INVENTION

The present invention, in one aspect, relates to a calcium-based secondary cell comprising:

a negative electrode that includes a negative-electrode active material, said negative-electrode active material being capable of accepting and releasing calcium ions, a positive electrode that includes a positive-electrode active material, said positive-electrode active material being capable of accepting and releasing calcium ions, an electrolyte arranged between the negative electrode and the positive electrode, said electrolyte comprising a calcium salt of a fluorine-containing anion of formula $(XF_n)^{m-}$ wherein n is a positive integer of at most 6 and m is a positive integer of at least 1 and m<n, wherein the positive-electrode active material is a one-dimensional structure accommodating $Ca^{2+}$ ions and has the formula (1):

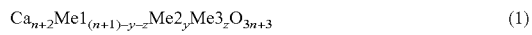

$$Ca_{n+2}Me1_{(n+1)-y-z}Me2_yMe3_zO_{3n+3} \qquad (1)$$

wherein:
Me1, Me2, Me3 are different transition metals;
1≤n and n is not necessarily an integer;
0≤y and y is not necessarily an integer;
0≤z and z is not necessarily an integer.

In certain embodiments of the present invention, y=0 and z=0 so that there is only transition metal Me1 present in the oxide material of formula (1) along with calcium, transition metals Me2 and Me3 being absent. Among positive-electrode active materials that can be used in such embodiments of the invention are: $Ca_3Co_2O_6$ and $CaCoO_3$.

As calcium salt in the electrolyte, for a central atom X of $(XF_n)^{m-}$ having a certain valence (oxidation state) v, the (negative) charge of the anion $(XF_n)^{m-}$ will be v−n i.e. the number of negative charges m is n−v. In preferred embodiments, the central atom X is a three- to six-valent (v=3 to 6) atom from one of groups 13 to 16 of the Periodic Table. Notably, the tetrafluoroborate salt of calcium, viz. $Ca(BF_4)_2$, is preferred in different aspects of the present invention. The salt $Ca(PF_6)_2$ can also be used. $Ca(PF_6)_2$ is not currently available commercially and it is difficult to prepare in a highly pure and stable state. For these reasons, $Ca(BF_4)_2$ is the most preferred fluorine-containing calcium salt in the present invention, although it is expected that $Ca(PF_6)_2$ shall provide, generally speaking, the same advantages.

Without wishing to be bound by any particular theory, it is believed that the calcium-transition metal oxides of formula (1), because they are electrochemically active in an upper potential window, may promote the interaction of the electrolyte salt with the current collector (such as aluminum) leading to the corrosion of the latter over time. In this respect, fluoride salts such as $Ca(BF_4)_2$ are believed to provide enhanced long-term cell stability with respect to other calcium salts that could be used in the electrolyte. $Ca(BF_4)_2$ allows Ca metal plating/stripping at the negative electrode, and therefore allows one to combine any positive materials with Ca metal, which is a huge advantage because the full cell voltage will be higher since the difference of potential between the positive materials and the Ca negative material is the highest possible one. Another advantage of $BF_4^-$ and $PF_6^-$ anions is that they passivate aluminium (Al) current collectors that would be corroded in presence of TFSI or other analogous anions. Such effects have been studied for lithium battery technology but not apparently for Ca batteries (cf. Zhang et al., *Journal of Power Sources*, 109:2 (2002), pages 458-464, Zhang et al., *Journal of the Electrochemical Society*, 152(11), 2005, B448-B454). It is believed that, in the present invention, in combination with one-dimensional positive-electrode active materials, a Cathode Electrolyte Interface formed on the cathode will contain $CaF_2$ if made from a fluorine-containing salt such as $Ca(BF_4)_2$, for example in a (organic) solvent system such as EC:PC. It is postulated that other known electrolytes such as $Ca(TFSI)_2$ or $Ca(ClO_4)_2$ would not allow the formation of $CaF_2$ which allows the $Ca^{2+}$ cations to migrate through it.

In further embodiments of the present invention, further transition metals Me2 and/or Me3 are present, so that the material of formula (1) is a mixed oxide of calcium with at least two transition metals. In preferred embodiments of the present invention, Me1, Me2 and Me3 are each independently chosen among Ni, Mn, Co, Cr and Fe. Among positive-electrode active materials that can be used in such embodiments of the invention are: $Ca_3NiMnO_6$; $Ca_3CoMnO_6$; $Ca_3CoFeO_6$; $Ca_3Co_{0.5}Fe_{0.5}MnO_6$; $Ca_3CrNiO_6$; $Ca_6Co_3NiCrO_{15}$; and $Ca_6Co_2Ni_2MnO_{15}$.

The use of further transition metals Me2 and/or Me3, so that the material of formula (1) is a mixed oxide of calcium with at least two transition metals, may provide various advantages. Firstly, since cobalt (Co) is very expensive, replacing at least some Co in a suitable Co-containing one-dimensional material, such as $Ca_3Co_2O_6$ or $CaCoO_3$, by another metal such as Me2 or Me3 may enable significant cost reduction for manufactured batteries. A second possible advantage is that the potential of the cathode material (and therefore of the full cell) may increase as follows: Fe<Mn<Ni~Co<Cr. Thirdly, having different metals may enable the operation potential to vary to some extent depending on the metal, providing cathodes operating at different potentials that may be tuned by modifying the metals.

In the present invention, it is possible to prepare a calcium-based secondary cell wherein the voltage of the full battery is preferably higher than 3 V, more preferably higher than 3.25 V, and most preferably higher than 3.5 V.

The invention further relates to a non-aqueous calcium-based secondary battery comprising a calcium-based secondary cell comprising a positive-electrode active material which is a one-dimensional structure accommodating $Ca^{2+}$ ions and having the formula (1) set out above, and to a vehicle, an electronic device, a robot, a wheelchair, an autonomous drone or a stationary power generating device comprising such a non-aqueous calcium-based secondary battery.

BRIEF DESCRIPTION OF THE FIGURES

FIG. 2a: $Ca_3Co_2O_6$ n=1; y=0; z=0; FIG. 2b: $Ca_3NiMnO_6$ n=1; y=1; z=0; FIG. 2c: $Ca_3CoMnO_6$ n=1; y=1; z=0; FIG. 2d: $Ca_3CoFeO_6$ n=1; y=1; z=0; FIG. 2e: $Ca_3Co_{0.5}Fe_{0.5}MnO_6$ n=1; y=0.5; z=0.5; FIG. 2f: $Ca_3CrNiO_6$ n=1; y=0.5; z=0.5; FIG. 2g: $CaCoO_3$ n=∞; y=0; z=0; FIG. 2h: $Ca_6Co_3NiCrO_{15}$ n=4; y=1; z=1; FIG. 2i: $Ca_6Co_2Ni_2MnO_{15}$ n=4; y=2; z=1.

DETAILED DISCLOSURE OF THE INVENTION

The present invention proposes a calcium-based secondary cell which may have an operating temperature ranging from 30° C. to 150° C. comprising, as a positive-electrode active material, a one-dimensional structure pre-calciated oxide-type material containing transition metals or mixture of transition metal, such as cobalt and/or nickel and/or manganese and/or iron and/or chromium and being capable of releasing and accepting calcium ions at a high voltage.

The calcium-based secondary cell of the invention includes a positive electrode that includes a positive-electrode active material, wherein the positive-electrode active material is a one-dimensional structure accommodating $Ca^{2+}$ ions and has the formula (1):

$$Ca_{n+2}Me1_{(n+1)-y-z}Me2_yMe3_zO_{3n+3} \qquad (1)$$

wherein Me1, Me2, Me3, n, y and z are as defined above.

Since y and z may both be zero, there may only be one transition metal (Me1), or two or three transition metals. As a counter-example, $Ca_2CoO_3$ would have Me1=Co, n=0, y=0 and z=0, and so is excluded. In effect, this does not correspond to a material with the required structure because the ratio Ca to Me is too high.

In the present invention, the mixed oxides having a "one-dimensional structure" are to be understood as systems in which the transition metal ions form linear structures: the transition metal oxides are linked by anion bridges, and form lines. Thus, all transition metal ions are linked through anion bridge(s) to two and only two other transition metal ions (except that at the surface, and/or grain boundaries, where transition metal ions are linked to only one transition metal), and they do not form closed cycles.

Examples of compounds that can be used in positive-electrode active materials for calcium-based secondary cells of the invention are as follows. This list is not exhaustive.

| | |
|---|---|
| $Ca_3Co_2O_6$ | n = 1; y = 0; z = 0 |
| $Ca_3NiMnO_6$ | n = 1; y = 1; z = 0 |
| $Ca_3CoMnO_6$ | n = 1; y = 1; z = 0 |
| $Ca_3CoFeO_6$ | n = 1; y = 1; z = 0 |
| $Ca_3Co_{0.5}Fe_{0.5}MnO_6$ | n = 1; y = 0.5; z = 0.5 |
| $Ca_3CrNiO_6$ | n = 1; y = 0.5; z = 0.5 |
| $CaCoO_3$ | n = ∞; y = 0; z = 0 |
| $Ca_6Co_3NiCrO_{15}$ | n = 4; y = 1; z = 1 |
| $Ca_6Co_2Ni_2MnO_{15}$ | n = 4; y = 2; z = 1 |

$CaCoO_3$ may be considered to have a one-dimensional structure, but is only octahedral and has no pyramids.

Figure 1:
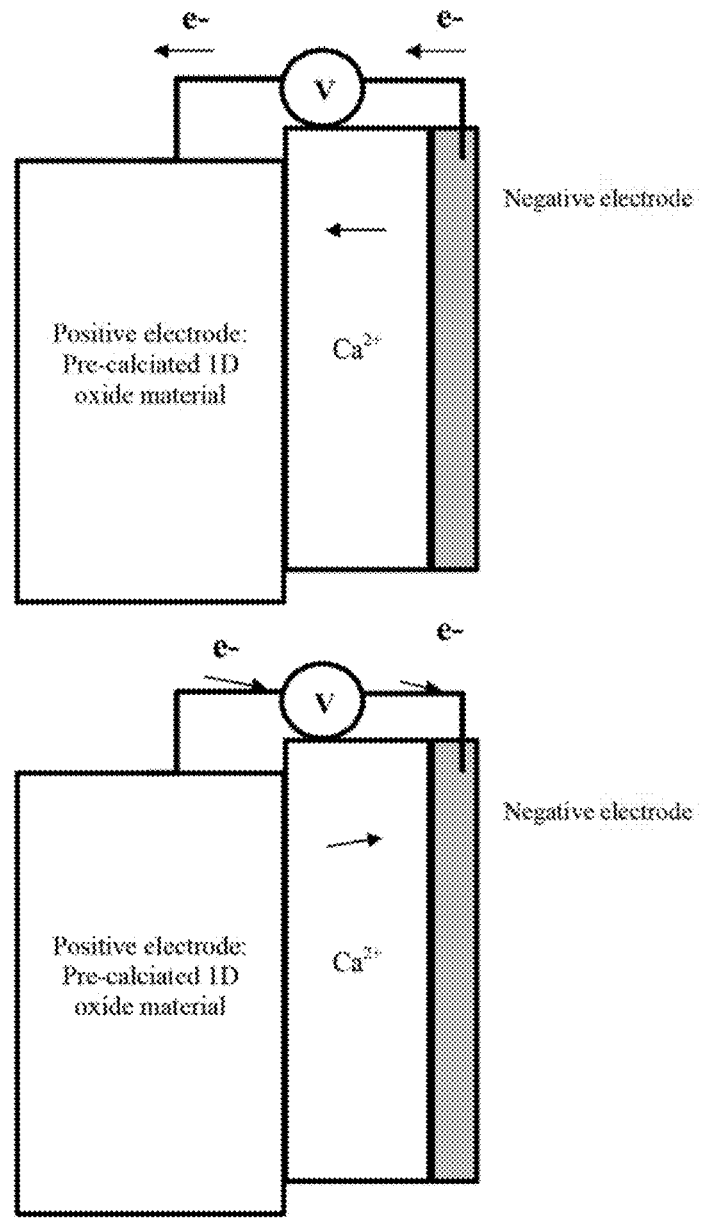
FIG. 1 is a schematic view of a rechargeable calcium-based full battery described in the present invention during the charge (bottom) and discharge (top) processes.
Figure 2:
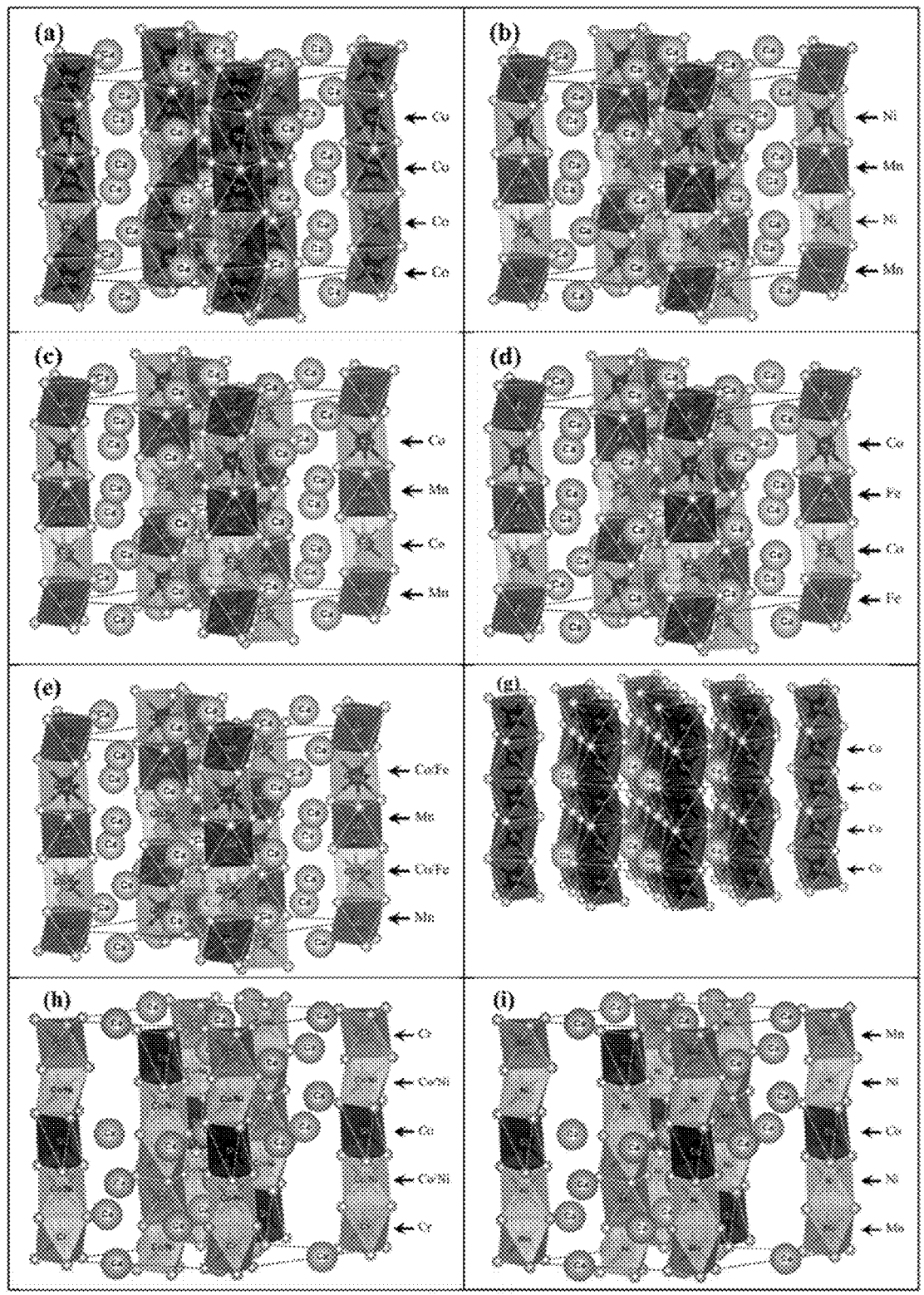
FIG. 2 shows one-dimensional (1D) structural chains of materials that can be used in the present invention.

Without wishing to be bound by any particular theory, it is considered that the one-dimensional (1D) chains, consisting of the 3d transition metal(s) and oxygen, are negatively charged and favor the diffusion of cations like $Ca^{2+}$ in the structure. These chains are negatively charged overall and the $Ca^{2+}$ ions can move along them. The 1D chains are infinite and consist in an alternation of trigonal and octahedral units in various configurations as described in FIG. 2. The chains contain a mixture of 3d transition metals and oxygen, forming polyhedra where the metal is in the center and the oxygen on the corners. The limit end composition would be $CaMeO_3$ and all metals would exhibit octahedral coordination. A mixture of 3d transition metals within the 1D chains might allow one to change the order of octahedral and trigonal polyhedral arrangements along the chains and enhance the $Ca^{2+}$ diffusion along those chains. For example, one could have arrangements as follows:

Octahedral/Trigonal/Octahedral/Trigonal (at start)
Octahedral/Trigonal/Trigonal/Octahedral/Octahedral/Trigonal (at intermediate)
Octahedral/Octahedral/Octahedral/Octahedral (at end)

Independently of the 3d transition metal(s) chosen, the voltage for de-intercalating $Ca^{2+}$ from 1D materials $Ca_{n+2}Me1_{(n+1)-y-z}Me2_yMe3_zO_{3n+3}$ used in the present invention is preferably comprised between 3 V and 5 V, more preferentially between 3 V and 4.8 V vs. $Ca^{2+}/Ca$. The voltage of the full Ca-based cell should be in the following order according to the amount of transition metal in the 1D-material: Fe<Mn<Co~Ni<Cr.

In cells of the present invention, the negative electrode may be an electrode comprising or consisting of a negative-electrode active material, said active material including metallic calcium or a calcium alloy. In one advantageous embodiment, the alloy has formula (I) $Ca_mB$ wherein m is 0≤m≤3 and B is a metal or a semi-conductor element. Preferred negative electrodes include Ca metal, or Ca-alloys such as $Ca_xSn_y$, $Ca_xSi_y$ where preferentially 0≤x≤2; among these alloys, $CaSi_2$ is preferred.

The negative electrode may be for example a foil of metallic calcium. In this case, the metallic calcium may also play the role of current collector. A pre-formed, metallic calcium-containing negative electrode can thus be used during assembly of a calcium-based secondary electrochemical cell.

The negative electrode may include a support, such as a current collector, having a metallic calcium coating as negative-electrode active material. The coating is obtainable by depositing metallic calcium on the collector. The coating may be present on part of the support only or on the entire support.

The collector may be in the form of a foil, foam or grid. The collector may comprise or consist of copper, aluminum, stainless steel, nickel, gold, platinum, palladium, titanium or carbon. For example, the collector may comprise or consist of one or more of copper, aluminum, stainless steel, nickel, gold, platinum and palladium. Alternatively, the collector may include or consist of carbon, for example type carbon paper. Copper, stainless steel, nickel and carbon, notably carbon and stainless steel, are cost-effective options. Use of gold or aluminum presents advantages in that these materials exhibit the lowest lattice mismatch with calcium. Carbon and aluminum present the advantage of being lighter.

Techniques are known to deposit metallic calcium on a support such as a collector. Electrochemical deposition is a possibility. In situ deposition of metallic calcium on a support previously added during cell assembly is a possibility. In situ deposition may take place while the cell is in use or in charge. Pulsed Laser Deposition or RF sputtering are other options. In this case, a target of pure calcium metal may be used. This target is commercially available for example from American Elements. Nickel foams or grids (on which metallic calcium may be deposited) are also commercially available from Goodfellow. Foams or grids made of copper or aluminum as well as carbon foams (one possible supplier of aluminum, copper or carbon foams is ERG-Materials & Aerospace Corporation) or carbon paper (one possible supplier of carbon paper is Toray), as foils or grids are also commercially available.

Use of a pre-formed, metallic calcium-containing negative electrode and metallic calcium deposition (e.g. in situ deposition) are not mutually exclusive options. If desired, metallic calcium deposition may be performed on a current collector already made of metallic calcium.

As mentioned above, in preferred embodiments, preferentially Ca metal is used as negative electrode material, for the advantages of the larger full cell voltage. In certain embodiments, no Ca metal may be needed during the building of the cell—only a negative current collector may be needed since the Ca might be provided solely through electroplating of $Ca^{2+}$ de-intercalated from the positive electrode material.

In a cell or battery according to the present invention, an electrolyte in the form of an electrolyte medium is arranged between the negative electrode and the positive electrode. In the present invention, in the electrolyte medium there is at least a fluorine-containing calcium salt of an anion of formula $(XF_n)^{m+}$ wherein n is a positive integer of at most 6 and m is a positive integer of at least 1 and m<n, and most preferably such calcium salts constitute all the calcium salt added to the electrolyte. Calcium tetrafluoroborate (Ca $(BF_4)_2$) is a particularly preferred calcium salt for the electrolyte in the present invention, and calcium hexafluorophosphate ($Ca(PF_6)_2$) may also be used. Other known calcium salts may potentially be present in the electrolyte, notably in the form of a fluorine-containing calcium salt. Such known calcium salts for use in calcium-based secondary cells include: calcium tetrafluorosulfonylimide (Ca $(TFSI)_2$) or ($Ca(N(SO_2CF_3)_2)_2$), calcium triflate $Ca(Tf)_2$, calcium trifluoromethanesulfonate ($Ca(CF_3SO_3)_2$) and mixtures thereof. The non-fluorine containing salt calcium perchlorate ($Ca(ClO_4)_2$) may also be present. Preferably, all salts added to the electrolyte medium are anhydrous.

The electrolyte salt(s) may appropriately be dissolved in an electrolyte solvent of the electrolyte medium. The salt(s) may be present in an amount comprised between 0.05 M and 2 M, such as between 0.1 M and 1 M, with respect to the volume of the electrolyte (electrolyte medium).

The electrolyte may be substantially free of other metal ions of Group I and II of the Periodic Table—for example lithium ions, sodium ions, potassium ions. This means that the amount of metal ions other than calcium possibly present in the electrolyte is electrochemically ineffective.

Each solvent present in the medium is substantially free of water. Unless otherwise indicated, "substantially free of water" means that the solvent may include water in an amount equal to or lower than 300 ppm, such as equal to or lower than 50 ppm, as measured with the Karl Fischer titration technique.

Advantageously, each solvent present in the medium and/or the combination thereof is stable at a temperature between at least −30 and 150° C. (stability window).

Each solvent present in the medium may independently be selected from the group consisting of cyclic carbonates, linear carbonates, cyclic esters, cyclic ethers, linear ethers and mixtures thereof.

Cyclic carbonates may be selected from the group consisting of ethylene carbonate (EC), propylene carbonate (PC), butylene carbonate, vinylene carbonate, fluoroethylenecarbonate (FEC) and mixtures thereof. A particularly preferred electrolyte solvent combination in the present invention is a mixture of ethylene carbonate (EC) and propylene carbonate (PC).

Linear carbonates may be selected from the group consisting of dimethyl carbonate (DMC), diethylcarbonate (DEC), ethyl methyl carbonate (EMC), and mixtures thereof.

Cyclic ester carbonates may be γ-butyrolactone and/or γ-valerolactone.

Cyclic ethers may be tetrahydrofuran (THF) and/or 2-methyltetrahydrofuran.

Linear ethers may be selected from the group consisting of dimethoxyethane (DME), ethylene glycol dimethyl ether, triethylene glycol dimethyl ether (TEDGE), tetraethyleneglycol dimethyl ether (TEDGE), and mixtures thereof.

In addition or as an alternative, the solvent may include dimethylsulfoxide (DMSO) or nitrile solvents (such as propionitrile, and 3-methoxypropionitrile).

Preferably one of the at least two solvents is ethylene carbonate (EC). For example, the electrolyte medium may include ethylene carbonate (EC) and propylene carbonate (PC), such as a combination of formula $EC_h:PC_{1-h}$ wherein the ratio is expressed as volume:volume and h is $0 \leq h \leq 1$, such as $0.2 \leq h \leq 0.8$ or h is 0.5. Mixtures of ethylene carbonate (EC) and propylene carbonate (PC) may be stable between −90° C. and 240° C. The solvent may be for example a combination of ethylene carbonate (EC), propylene carbonate (PC) and dimethyl carbonate (DMC), such as a combination having formula $EC_x:PC_y:DMC_z$ wherein the ratio is expressed as volume:volume and $0 \leq x,y,z \leq 1$ and $x+y+z=1$.

The at least two solvents may be present in a total (i.e. combined) amount comprised between about 50 and 99% by mass, with respect to 100% by mass of the electrolyte (mass of the total electrolyte medium). For example, the solvents may be present in an amount comprised between about 70 and 99% by mass, with respect to 100% by mass of the electrolyte. This range is preferred for having liquid electrolytes. When the electrolyte medium further includes a polymer—such as a gelling polymer—the solvents are advantageously present in an amount comprised between about 50 and 70% by mass, with respect to 100% by mass of the electrolyte. This range is preferred for having gel polymer electrolytes.

In preferred embodiments of the present invention, the electrolyte will contain $Ca(BF_4)_2$ in ethylene carbonate (EC): propylene carbonate (PC). Here a concentration of around 0.45 M of $Ca(BF_4)_2$ will generally be appropriate.

The electrolyte medium may further include a component (such as a crown ether) that facilitates calcium salt dissociation and/or enhances calcium salts dissolution.

The electrolyte medium may further include a gelling polymer. This is typically the case of gel polymer electrolytes.

The gelling polymer may be selected from the group consisting of polyethylene oxide (PEO), polyvinylidene fluoride (PVDF), polyacrylonitrile (PAN), polymethyl methacrylate (PMMA), poly(vinyl) chloride (PVC), and mixtures thereof.

When the electrolyte medium contains a gelling polymer as defined above, it may further comprise a filler, the filler including:

a component which can be cross linked and/or thermoset for example to improve the electrolyte mechanical properties, a plasticizer, for example to improve the electrolyte ionic conductivity, nanoparticles/nanoceramics, and/or a component (such as a crown ether) that facilitates calcium salt dissociation and/or enhances calcium salt dissolution.

Nanoparticles/nanoceramics may include $Al_2O_3$, $SiO_2$, $ZrO_2$, MgO, and/or $CeO_2$ and may have an average particle size equal to or lower than about 15 nm. This component may be added to increase the electrolyte conductivity. Suitable $Al_2O_3$ nanoparticles having an average particle size of 5.8 nm are commercially available from Aldrich Research Grade. Suitable $SiO_2$ nanoparticles having an average particle size of 7.0 nm are commercially available from Aldrich Research Grade.

The filler may be present in an amount of lower than 10% by weight with respect to the weight of the total gel polymer electrolyte.

As mentioned above, Ca—Si alloys may be used in negative electrode materials of the invention. Ca—Sn alloys are also candidates. The following tables show corresponding properties in terms of formula, molar mass and theoretical specific capacity:

TABLE 1

| | Molar mass (g/mol) | Theoretical Specific capacity (mAh/g) |
|---|---|---|
| Si | 28.086 | 3818 |
| $Ca_3Si$ | 148.32 | 1084 |
| $Ca_2Si$ | 108.24 | 991 |
| $Ca_5Si_3$ (or $Ca_{5/3}Si$) | 314.65 | 852 |
| CaSi | 68.164 | 787 |
| $Ca_3Si_4$ (or $Ca_{3/4}Si$) | 232.58 | 692 |
| $CaSi_2$ (or $Ca_{0.5}Si$) | 96.250 | 557 |

TABLE 2

| | Molar mass (g/mol) | Theoretical Specific capacity (mAh/g) |
|---|---|---|
| Sn | 118.71 | 903 |
| $Ca_3Sn$ | 238.94 | 673 |
| $Ca_2Sn$ | 198.71 | 540 |
| $Ca_5Sn_3$ (or $Ca_{5/3}Sn$) | 556.52 | 482 |
| $Ca_7Sn_6$ (or $Ca_{7/6}Sn$) | 992.81 | 378 |
| CaSn | 158.79 | 338 |

The negative electrode active material may contain one or more distinct alloys.

In the present invention, the negative electrode may be prepared as a powder composite negative electrode. This electrode is obtainable by processing, such as compressing, a mixture (a) including, such as consisting of:

component (a1) which is the negative electrode active material, for example a calcium alloy as defined above, and component (a2) which displays electronic conducting properties and/or electrode volume change constraining properties.

Obtaining mixture (a) may be performed by common techniques. For example, mixture (a) can be obtained by simply mixing the various components for example by means of planetary mills (such as ball miller commercially available from Fritsch).

Component (a1) may be used in an amount comprised between about 50% and about 100%, preferably between about 65% and about 95%, such as between about 70% and about 90%, for example about 75% with respect to the weight of mixture (a). Component (a2) may be used in an amount comprised between about 0% and about 40%, preferably between about 10% and about 30%, for example 25% with respect to the weight of mixture (a).

The properties of component (a2) are thought to be useful when the negative electrode is in use.

The negative electrode may be a composite film negative electrode. This electrode is obtainable by processing a slurry (b) including, such as consisting of:

component (b1) which is the negative electrode active material, for example a calcium alloy as defined above, component (b2) which displays electronic conducting properties and/or electrode volume change constraining properties, component (b3) which is a binder, component (b4) which is a solvent.

Component (b1) may be used in an amount comprised between about 50% and 90% by weight with respect to the combined weight of components (b1) to (b3), i.e. the solid content of slurry (b). When component (b1) contains silicon, for example a silicon-containing alloy of formula (I), it may be present in an amount of about 70% by weight with respect to the combined weight of components (b1) to (b3). When component (b1) contains tin, for example a tin-containing alloy of formula (I), it may be present in an amount of about 85% by weight with respect to the combined weight of components (b1) to (b3).

Component (b2) may be used in an amount comprised between about 5% and 30% by weight with respect to the combined weight of components (b1) to (b3). When component (b1) contains silicon, for example a silicon-containing alloy of formula (I), component (b2) may be present in an amount of about 22% by weight with respect to the combined weight of components (b1) to (b3). When component (b1) contains tin, for example a tin-containing alloy of formula (I), component (b2) may be present in an amount of about 7% by weight with respect to the combined weight of components (b1) to (b3).

Component (b3) may be used in an amount comprised between about 5% and 25% by weight with respect to the combined weight of components (b1) to (b3). When component (b1) contains silicon, for example a silicon-containing alloy of formula (I), component (b3) may be present in an amount of about 8% by weight with respect to the combined weight of components (b1) to (b3). When component (b1) contains tin, for example a tin-containing alloy of formula (I), component (b3) may be present in an amount of about 8% by weight with respect to the combined weight of components (b1) to (b3).

Component (b4) may be used in any amount suitable to impart a workable viscosity to the slurry. For example, it may be used in an amount of about 500% by weight with respect to the combined weight of components (b1) to (b3).

Slurry (b) may further comprise components commonly used in electrode manufacturing such as component (b5) suitable to impart self-standing properties to the negative electrode.

Components (a1) and (b1) may be in the form of particles having an average particle size falling in the range of 0.01 to 100 microns, such as in the range of 0.15 to 50 microns. Average particle size may be either communicated by the particle supplier, or measured by e.g. SEM (scanning electron microscopy), TEM (transmission electron microscopy) or laser granulometry techniques.

In the context of slurry (b), component (b2) can typically facilitate slurry preparation and deposition. Components (a2) and (b2) may comprise, such as consist of particulate carbon. Particulate carbon may be selected within one or more of carbon black such as ketjen black, acetylene black, channel black, furnace black, lamp black, and thermal black; graphite, such as natural graphite, e.g., scaly graphite, artificial graphite, and expanded graphite; activated carbon from charcoal and coal; carbon fibers obtained by carbonizing synthetic fibers and petroleum pitch-based materials; carbon nanofibers; tubular carbon, such as carbon nanotubes; and graphene. A suitable conductive carbon black is Carbon Super P® commercially available from TIMCAL. The main characteristics of Super P® are their high purity, high structure and their moderate surface area. The high purity is evidenced by the low ash, moisture, sulfur and volatile contents, while their high structure is expressed by oil absorption and electrical conductivity. Super P® conductive carbon black is a carbon black with a high to very high void volume originating from the interstices between the carbon black particle due to its complex arrangement and porosity, in a particular structure. Such a structure allows retention of a conductive carbon network at low to very low carbon content in the electrode mix. Super P® is a material with no, or nearly no sieve residue on the 325 mesh sieve.

Component (b3) is typically used to ensure the cohesion of the negative electrode components. Component (b3) may comprise, such as consist of a thermoplastic and/or a thermosetting resin. Component (b3) may be selected from the group consisting of polyethylene, polypropylene, polytetrafluoroethylene (PTFE), polyvinylidene fluoride (PVDF), styrene-butadiene rubber (SBR), carboxymethylcellulose (CMC) or salts thereof showing various molecular weights and mixtures thereof. For example, component (b3) may be a combination of CMC and SBR.

Component (b3) may also be selected from the group consisting of tetrafluoroethylene-hexafluoropropylene copolymers, tetrafluoroethylenehexafluoropropylene copolymers (FEP), tetrafluoroethylene-perfluoroalkyl vinyl ether copolymers (PFA), vinylidene fluoride-hexafluoropropylene copolymers, vinylidene, fluoride-chlorotrifluoroethylene copolymers, ethylenetetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, and mixtures thereof.

Component (b3) may also include a copolymer having sulfonate group-terminated perfluorovinyl ether groups attached to a poly(tetrafluoroethylene) backbone. An example is copolymers commercially available under the name Nafion®. For example, the copolymer may be a dispersion of a copolymer having sulfonate group-terminated perfluorovinyl ether groups attached to a poly(tetrafluoroethylene) backbone in a mixture of water and 20% by weight of alcohol. This product is commercially available under trademark LIQUION™ from Ion Power Inc.

Component (b4) is typically used to impart a viscous aspect to slurry (b). Component (b4) may be a solvent selected from the group consisting of acetone, alcohols such as ethanol, cyclic aliphatic hydrocarbon compounds such as cyclohexane, N-methyl-2-pyrrolidone (NMP), propylene carbonate (PC), N,N-dimethylformamide, tetrahydrofuran (THF), water and mixtures thereof.

An example of component (b5) is a plasticizer such as any one or more of poly ethylene glycol (PEG) and dibutylphtalate (DBP).

Obtaining slurry (b) may be performed by common techniques. For example slurry (b) can be obtained by dispersing solid components (e.g. components (b1) to (b3)) in component (b4) for example by means of a high-performance disperser (such as dispersers available from IKA) or an ultrasonic disperser (such as dispersers available from Hielscher) or/and by means of a centrifugal mixer (such as commercially available from Thinky). WO 2013/139370 discloses for example a method for manufacturing a slurry by suspending particulate carbon, a binder and optionally a catalyst in a solvent.

A composite film negative electrode as defined above (whether self-standing or supported) may be manufactured by a method comprising a step i) of depositing the negative electrode active material, e.g. in the form of a slurry (b), on a support.

Depositing may be casting or impregnating, as appropriate depending e.g. on the desired structure of the electrode (self-standing or supported on a current collector and, in this latter case, the type of current collectors used).

Casting may be performed by the Doctor Blade method, which allows a fine control of the thickness of the active material deposited layer. For casting, the support may be in the form of a foil. For casting, the support may be made of e.g. copper, aluminum, stainless steel, nickel, gold, platinum, palladium, titanium or carbon if it is a current collector or e.g. glass or Teflon for self-standing electrodes.

Impregnating may be performed as disclosed in WO 2013/139370 (PCT publication page 16, line 19 onwards) wherein a carbon foam support is impregnated with a slurry containing particulate carbon, a binder, a solvent and optionally a catalyst for the manufacture of a negative electrode active material for lithium-air batteries. Typically, impregnating is chosen when the support is a current collector in the form of a foam.

When the negative electrode is designed to be a self-standing one, such as a self-standing film negative electrode, the method may further comprise a step ii-1) of drying the active material deposited on the support and a subsequent step iii-1) of removing, for example peeling off, the support.

Alternatively, the method may further comprise a step ii-2) of drying the active material, deposited on the support and a subsequent step iii-2) of further processing the product obtained in step ii-2). This embodiment of the method is suitable to obtain negative electrodes in which the support is a current collector as defined above and hence it is part of the final negative electrode. Further processing in step iii-2) may include a step of heat treating the product of step ii-2). Typically, heat treating is performed at a temperature lower than the melting temperature of the alloy(s) contained in the active material.

Further processing in step iii-2) may include a step of cutting and/or pressing the optionally heat-treated product of step ii-2). Typically, pressing is performed under a pressure between $10^7$ to $10^9$ Pa. Cutting and pressing may be performed in any order.

In the present invention, the positive-electrode active material containing a calcium-transition metal mixed oxide-based material may also be formulated as a part or the whole of a powder composite positive electrode, using processing techniques as described above for the negative electrode. When preparing a powder electrode mixture for the present invention, calcium-transition metal mixed oxide-based materials may be prepared to which an electronic conductor (such as carbon, or metal particles) is added. Similarly, the positive-electrode active material containing a calcium-transition metal mixed oxide-based material may also be formulated as a part or the whole of a composite film positive electrode, using processing techniques as described above for the negative electrode. Thus, a slurry may be prepared containing one or more of the above-described calcium-transition metal mixed oxide-based materials, an electronic conductor (such as carbon, or metal particles) and/or a binder (such as PVDF, PTFE, CMC, Nafion). The resulting slurry may be coated on a current collector in the form of a foil (Al foil) or in the form of foam (such as Al foam, carbon foam) or in form of a porous membrane (such as carbon paper).

In a calcium-based secondary cell according to the invention, in the dry weight of the powder mixture or slurry composition used to form a positive-electrode active layer/coat a conducting electrode surface (such as a metal foil), the positive-electrode active material which is a calcium-transition metal mixed oxide-based material may appropriately constitute at least 50% by weight, such as at least 60%, at least 70%, at least 80%, or at least 90% by weight of the total dry weight of the powder mixture or slurry composition, the remainder typically comprising, notably, conductive components such as carbon-based materials and binders such as polymer binders.

Advantageously, the cell of the present invention may further comprise a temperature control element. For example the temperature control element may not be physically part of (e.g. an integral part of) the cell but they may be configured to interact. The temperature control element may be configured to provide heating functionality and/or cooling functionality, e.g. depending on whether the cell is used in a context—such as a fuel engine—wherein a heat source is already present. An element configured to provide at least cooling functionality may be advantageous when considering the unavoidable self-heating of the cell when in use due to the Joule effect. Alternatively, the temperature control element may be configured to provide instructions to heating and/or cooling elements present with the cell. Background information on possible technical solutions to pre-heat high-voltage battery packs in hybrid electric vehicles up to room temperature (i.e. 25 degrees) can be found for example in A. Pesaran et al. "Cooling and Preheating of Batteries in Hybrid Electric Vehicles", The $6^{th}$ ASME-JSME Thermal Engineering Joint Conference, Mar. 16-20, 2003, TED-AJ03-633.

The temperature control element is configured to bring and/or maintain the cell at a temperature between about 30° C. and 150° C., such as between about 50° C. and 130° C., or at more than 75° C. and/or less than 110° C., which was found to be particularly effective for operating the cell presently disclosed. More preferred temperature ranges of operation are between 60° C. and 80° C., more preferably between 70° C. and 80° C., and most preferably around 75° C. Although it is not intended to be bound by any theory, it is believed that at this temperature an appropriate conductivity of the SEI (solid-electrolyte interphase) can be achieved and/or an improved ion-pairing would occur, in any of the above mentioned cases improving the battery performances. Accordingly, if the cell is operated in an environment characterized by low temperatures (such as a device or a vehicle exposed to winter temperatures), the temperature control element is suitably provided and/or coupled with heating means (for example pre-heating means), such as a resistance heater and/or a heat pump, so as to bring the cell to desired operating temperature. The temperature control element may also be provided with cooling means, for example a fan configured to blow forced air and/or a refrigeration unit configured to operate a refrigeration cycle, so as to maintain the cell within a suitable window of operating temperatures in case the device of the vehicle is provided with a heat source such as a fuel engine or the cell, power inverter, or other devices nearby generate heat.

According to some embodiments, the temperature control element may include cooling means only for those applications intended to be consistently exposed to temperatures above about 30° C. The temperature control element may be an integral cell thermal management device including both a heating and a cooling means. The device may be operated in a controlled manner by e.g. a computer-assisted device (also possibly part of the temperature control element) so as to reach and maintain an appropriate operating temperature depending on the ambient conditions.

The cell may further comprise a separator. The separator may be a porous film or a non-woven fabric. For example, the separator may comprise polyethylene, polypropylene, cellulose, polyvinylidene fluoride and glass ceramics or mixtures thereof. The separator may contain the electrolyte. A secondary cell incorporating this embodiment may be obtainable by contacting, e.g. impregnating, the separator with a liquid electrolyte.

The secondary cell may have any form, such as prismatic or cylindrical form.

In one aspect, the present disclosure discloses a non-aqueous calcium-based secondary battery comprising a calcium-based secondary cell as defined above, for example a plurality of calcium-based secondary cells wherein at least one is a calcium-based secondary cell as defined above or a plurality of calcium-based secondary cells each independently being as defined above. The battery may include one or more secondary cells as defined above, and a casing. The casing may be surrounded by a temperature control element as defined above, in case this element is present.

In one aspect, the present disclosure discloses a vehicle, such as a motor vehicle, comprising a non-aqueous calcium-based secondary battery as defined above.

In one aspect, the present disclosure discloses an electronic device, such as an information-related device or a communication device (for example a personal computer, camcorder or cellular phone), comprising a non-aqueous calcium-based secondary battery as defined above.

In one aspect, the present disclosure discloses a stationary power generating device comprising a non-aqueous calcium-based secondary battery as defined above.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

Unless otherwise stated, the potentials (in Volt) in the present description and drawings are given versus $Ca^{2+}/Ca$. Potentials are measured by a potentiostat versus a Quasi Reference Electrode. Typically ferrocene or a similar internal standard such as cobaltocene is used. Use of ferrocene is known to be suitable for non-aqueous media.

EXAMPLES

The following experimental examples are illustrative and enable the functioning of the invention to be understood. The scope of the invention is not limited to the specific embodiments described hereinafter.

Example 1: Ca//$Ca_3Co_2O_6$ Electrode Cell

Positive Material Preparation $Ca_3Co_2O_6$ material was prepared as follows: calcium nitrate tetrahydrate ($Ca(NO_3)_2 \cdot 4H_2O$, 99%, Sigma-Aldrich) and cobalt nitrate hexahydrate ($Co(NO_3)_2 \cdot 6H_2O$, 98%, Sigma-Aldrich) were weighed in a molar ratio of 3:2 and put together in a glass vial. Five parts citric acid ($C_6H_8O_7$, 99%, Sigma-Aldrich), ten parts ethylene glycol ($C_2H_6O_2$ 99%, Sigma-Aldrich) and finally 12 ml of DI-water were added to this vial. Subsequently, the solution was stirred over night at room temperature. The water evaporation was started without special concern for the heating rate by turning on the hotplate to full power. The stirring bar was removed when the viscosity had increased visibly. Nitrous oxide gases are formed as decomposition products when most of the water is removed. The forming gel was dried as much as possible and the resulting powder with the gel left-overs are placed in an aluminum crucible. To decarbonize the powder with subsequent crystallization, the oven was heated up under air first at 600° C. for eight hours. Afterwards the product was ground by pestle and mortar and stored in air until further use.

Figure 3A:
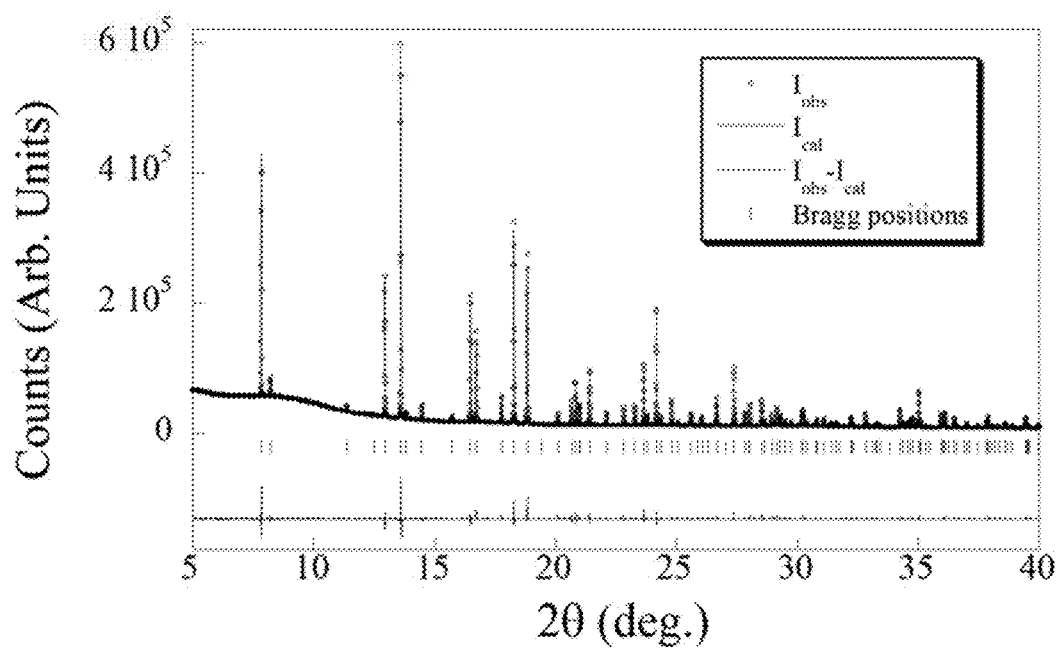
FIG. 3a represents the refined synchrotron X-Ray diffractions (XRD) of the pristine (initial) $Ca_3Co_2O_6$ based electrode.
Figure 3B:
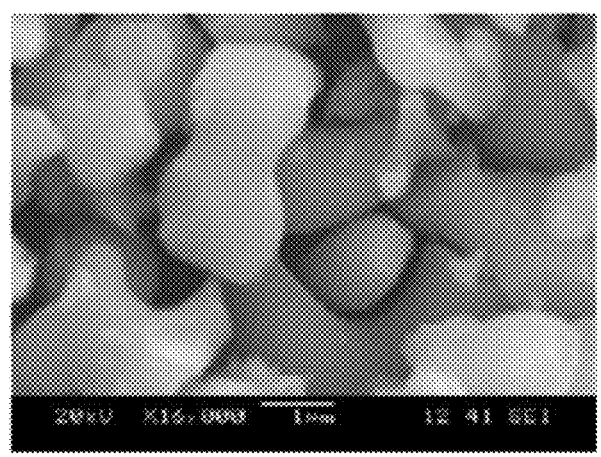
FIG. 3b represents the Scanning Electron Microscope pictures of the particles. This material shows a 1D structure with an average particle sizes comprised between 1 and 4 μm.

FIG. 3a represents the refined synchrotron X-Ray diffractions (XRD) of the pristine (initial) $Ca_3Co_2O_6$ based electrode. FIG. 3b represents the Scanning Electron Microscope pictures of the particles. This material presents a 1D structure with an average particle sizes comprised between 1 and 4 μm.

Electrode Preparation

Disk electrodes were produced by coating slurry on aluminum foil. The slurry is prepared by mixing active material, Csp carbon as electronic conductor and PVDF binder in a weight ratio of 80/10/10 (mixed with 0.25 g carbon black (super P) and 2 g of 10% solution of PVDF in NMP). To achieve the right viscosity, NMP is added as long as the slurry exhibits a flow. Mixing is done by means of ball milling in an agate container with 3 agate balls of 1 cm diameter at 500 rpm for 2 h with change of the rotating way every 30 min using a PM100 Retsch planetary Ball Miller.

The slurries were tape cast on a 20 μm thick aluminum foil (Goodfellow) with a 400 μm Doctor-Blade and dried at 120° C. under vacuum for 2 h. Once dried, 1 $cm^2$ disk electrodes were cut and pressed at 8 tons prior to testing.

Electrochemical Cell Assembly and Testing

A three electrode Swagelok cell was used for the electrochemical test. Self-made calcium disks were used both as reference and counter electrodes by pressing calcium grains (Alfa Aesar, redistilled 99.5%) to pellets of 1 cm in diameter and app. 1 mm height using a die and a hydraulic press. Within a glove box ($H_2O$<0.5 ppm, $O_2$<0.5 ppm) the surface of the calcium discs was cleaned by scratching using a spatula.

Aluminum current collector was used for the positive electrode, stainless steel for the counter and reference electrodes. Two sheets of Whatman® Grade GF/D borosilicate glass fiber were used as separators. The cell was assembled inside the glove box using 600 μl of electrolyte.

Said electrode (typical loading ca. 4 mg/$cm^2$ of active material) was used for potentiodynamic cycling with galvanostatic acceleration (PCGA) test at a C/200 rate and 100° C.

Figure 4:
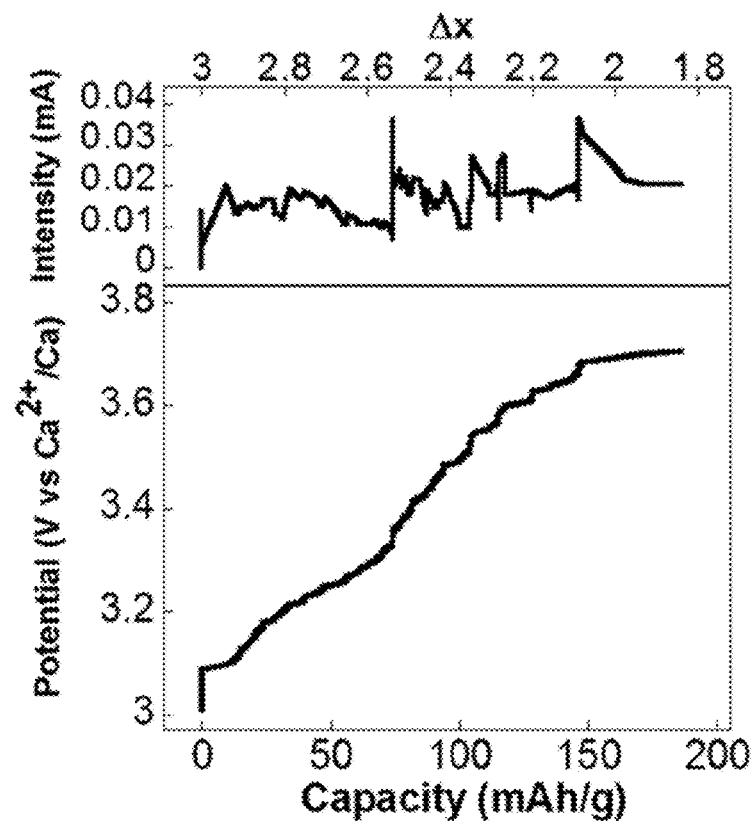
FIG. 4 represents the first charge of $Ca_3Co_2O_6$ electrode. The test was performed at 100° C. using a Ca counter electrode in 0.45 M $Ca(BF_4)_2$ in EC:PC electrolyte from Solvionic with less than 60 ppm $H_2O$ content.

FIG. 4 represents the first charge of $Ca_3Co_2O_6$ electrode. The test was performed at 100° C. using a Ca counter electrode in 0.45 M $Ca(BF_4)_2$ in EC:PC electrolyte from Solvionic with less than 60 ppm $H_2O$ content.

Figure 5:
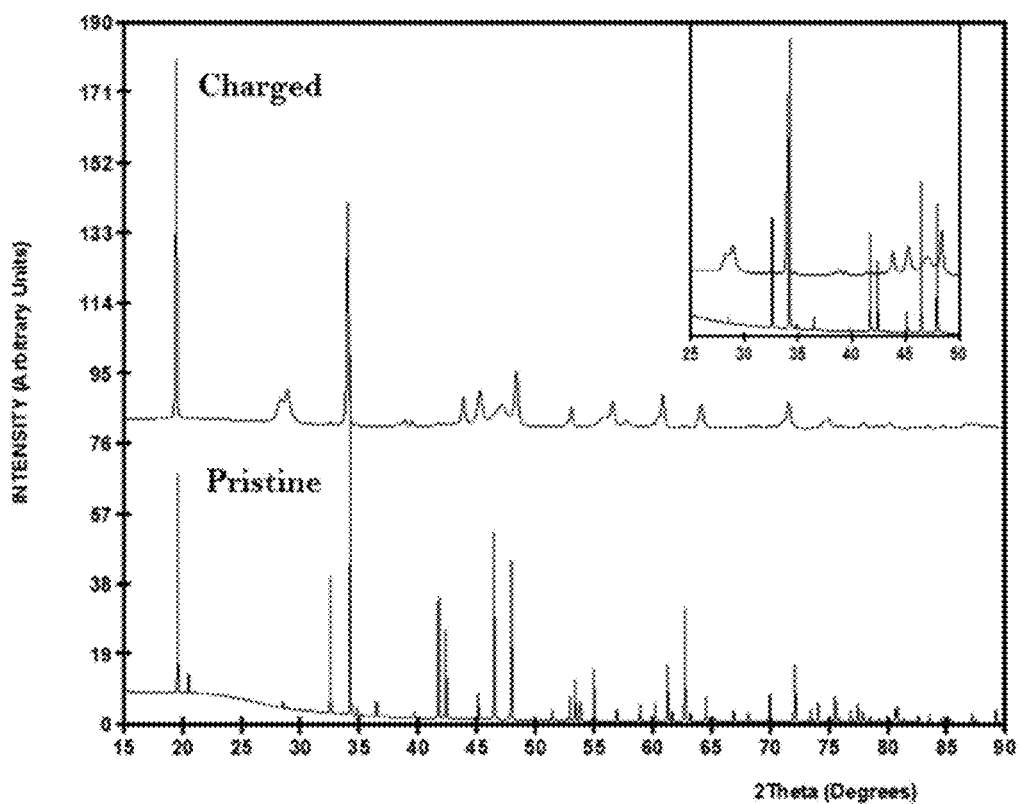
FIG. 5 represents the X-Ray diffractions (XRD) of the pristine (initial) $Ca_3Co_2O_6$ based electrode and of the same electrode after charge. A clear change of structure is observed during charge.

FIG. 5 represents the X-Ray diffractions (XRD) of the pristine (initial) $Ca_3Co_2O_6$ based electrode and of the same electrode after charge. A clear change of structure is observed during charge.

Example 2: Ca//$Ca_3NiMnO_6$ Full Cell

Positive Material Preparation

The synthesis was performed according to the paper "*Crystal Structure and Magnetic Properties of One-Dimensional Oxides $Ca_3AMnO_6$ (A=Zn, Ni)*" by G. V. Bazuev, V. G. Zubkov, F. Berger, and T. I. Arbuzova, *Russian Journal of Inorganic Chemistry*, Vol. 45, No. 7 (2000), pp. 1091-1097.

Calcium carbonate $CaCO_3$ (special purity grade) and oxides $MnO_2$, $NiO_2$ (99.9% chemical purity) were used as initial compounds in the synthesis of $Ca_3NiMnO_6$. The target compounds were prepared by the solid-phase method. This method involved the calcination of the pressed initial compounds first at 950° C. for 30 h and then at 1230° C. for 12 h.

It is to be noted that the synthesis can also be performed according to the paper "*Synthesis, Structure, and Magnetic Properties of $Ca_3BMnO_6$ (B=Ni, Zn) and $Ca_3ZnCoO_6$ Crystallizing in the $K_4CdCl_6$ Structure*" by Shuji Kawasaki and Mikio Takano, *Journal of Solid State Chemistry*, 145, 302-308 (1999).

Polycrystalline samples were prepared as follows using a citrate sol-gel precursor technique to improve reactivity and chemical homogeneity. First, $CaCO_3$, metallized Mn and Ni, each with a purity of 99.9%, were dissolved in a concentrated nitric acid, to which citric acid and ethyl ether were subsequently added for sol formation. The solution was gradually heated at 100 & 350° C. for evaporation and metamorphosis into the gel form. The gel was then decomposed into oxide powder by heating it at 600° C. for 12 h in an oxygen stream of atmospheric pressure.

The final product was obtained from the decomposed gels by adding a process of grinding, pelletization, and heating in the air at 900° C. for 48 h in total.

Electrode Preparation

The same electrode preparation protocol is used as in Example 1.

Electrochemical Cell Assembly

The same protocol is used as in Example 1 for the electrochemical assembly of the Ca//Ca$_3$NiMnO$_6$ full cell.

Example 3: Ca//Ca$_3$Co$_{1+x}$Mn$_{1-x}$O$_6$ Full Cell

Positive Material Preparation

The synthesis was performed according to the paper "*Synthesis, Crystal Structure, and Magnetic Properties of Quasi-One-Dimensional Oxides Ca$_3$Co$_{1+x}$Mn$_{1-x}$O$_6$*" by V. G. Zubkov, G. V. Bazuev, A. P. Tyutyunnik, and I. F. Berger, *Journal of Solid State Chemistry*, 160, 293-301 (2001).

The starting reactants for synthesis of Ca$_3$Co$_{1+x}$Mn$_{1-x}$O$_6$ were calcium carbonate CaCO$_3$ (special purity grade) and MnO$_2$ and CoO (at least 99.9% pure). The target compounds were prepared using solid-state reactions. Compacted blends of the starting reactants were sintered first for 30 h at 950° C. and, then, for 24 h at 1000 or 1200° C. depending on the composition. Final treatment was carried out in oxygen.

Electrode Preparation

The same electrode preparation protocol is used as in Example 1.

Electrochemical Cell Assembly

The same protocol is used as in Example 1 for the electrochemical assembly of the Ca//Ca$_3$Co$_{1+x}$Mn$_{1-x}$O$_6$ full cell.

Example 4: Ca//Ca$_3$Co$_{2-x}$Fe$_x$O$_6$ Full Cell

Positive Material Preparation

The synthesis was performed according to the paper "*Structural and magnetic properties of spin chain compounds Ca$_3$Co$_{2-x}$Fe$_x$O$_6$*" by A. Jain, Sher Singh, and S. M. Yusuf, *Physical Review* B 74, 174419 (2006).

Polycrystalline samples of Ca$_3$Co$_{2-x}$Fe$_x$O$_6$ with x=0, 0.1, 0.2, and 0.4 were prepared by solid state reaction method. The required amounts of reagents CaO, Co$_3$O$_4$, and Fe$_2$O$_3$ were intimately mixed using an agate mortar pestle and placed in alumina crucibles. These powders were calcinated at 800° C. for 24 h and then pressed in the form of bars under 2 ton/cm$^2$ and subsequently heated at 1000° C. for 48 h with intermediate grindings.

Electrode Preparation

The same electrode preparation protocol is used as in Example 1.

Electrochemical Cell Assembly

The same protocol is used as in Example 1 for the electrochemical assembly of the Ca//Ca$_3$Co$_{2-x}$Fe$_x$O$_6$ full cell.

Comparative Example 1

A Ca//Ca$_4$Co$_3$O$_9$ full cell was prepared, assembled and tested under the same conditions as described in Example 1. The electrode was prepared as described in Example 1, by replacing Ca$_3$Co$_2$O$_6$ by Ca$_4$Co$_3$O$_9$. Ca$_4$Co$_3$O$_9$ (99.9% purity) was purchased from Sigma Aldrich (Product Number: 791032). The obtained full cell was tested as in Example 1.

Figure 6:
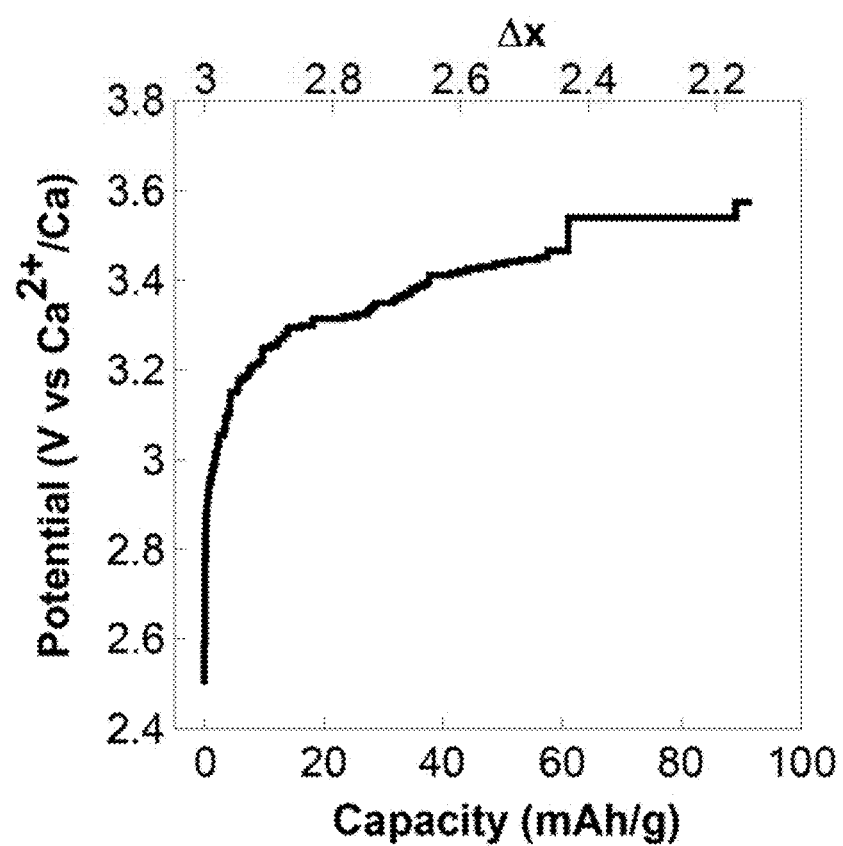
FIG. 6 shows a study of (apparent) electro-activity of $Ca_3Co_4O_9$.
Figure 7:
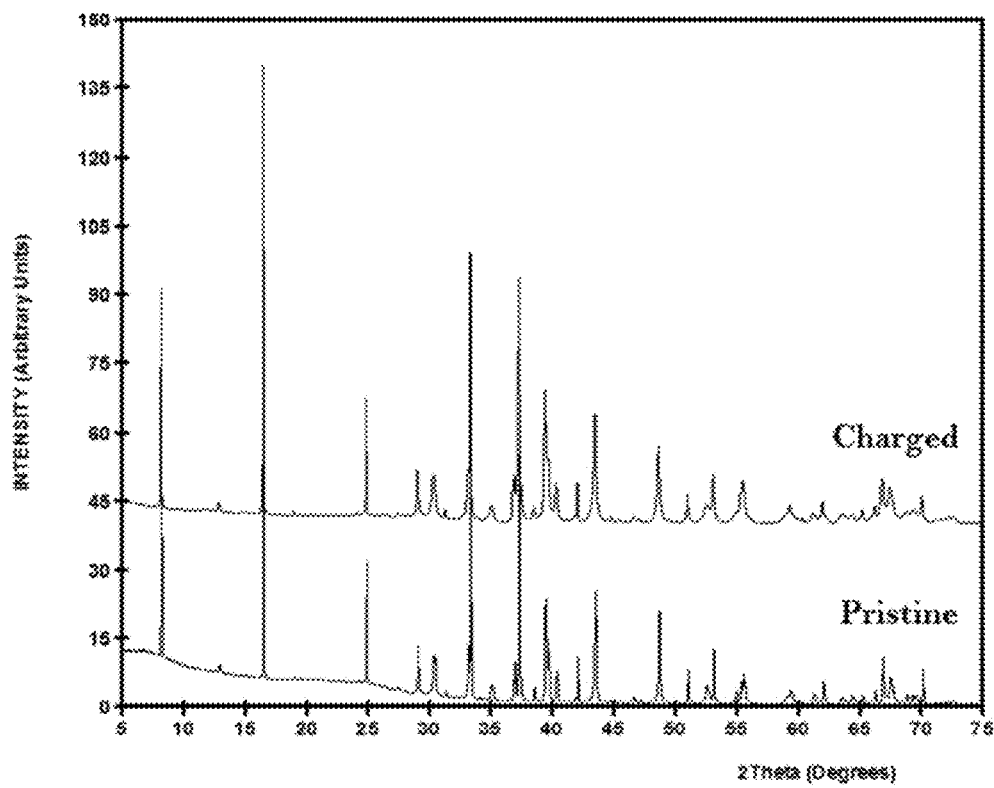
FIG. 7 provides XRD data for $Ca_3Co_4O_9$.

Ca$_4$Co$_3$O$_9$ is used as a reference tested in the same conditions as Ca$_3$Co$_2$O$_6$ in order to demonstrate the importance of the structure and composition of the pre-calciated Cobalt based material. Although it seems like Ca$_3$Co$_4$O$_9$ is electro-active (FIG. 6), the XRD (FIG. 7) highlight that Ca$_3$Co$_4$O$_9$ is NOT electro-active (since no structural changes happens during the charge process). The sole presence of Co is thus not sufficient—Ca$_4$Co$_3$O$_9$ does not function, probably because it does not have the required structure.

Comparative Example 2

A Ca//V$_2$O$_5$ full cell was prepared, assembled and tested under the same conditions as described in Example 1. The electrode was prepared as described in Example 1, by replacing Ca$_3$Co$_2$O$_6$ by V$_2$O$_5$. The obtained full cell is representative of Prior Art 8 (WO 2016/050331).

Figure 8:
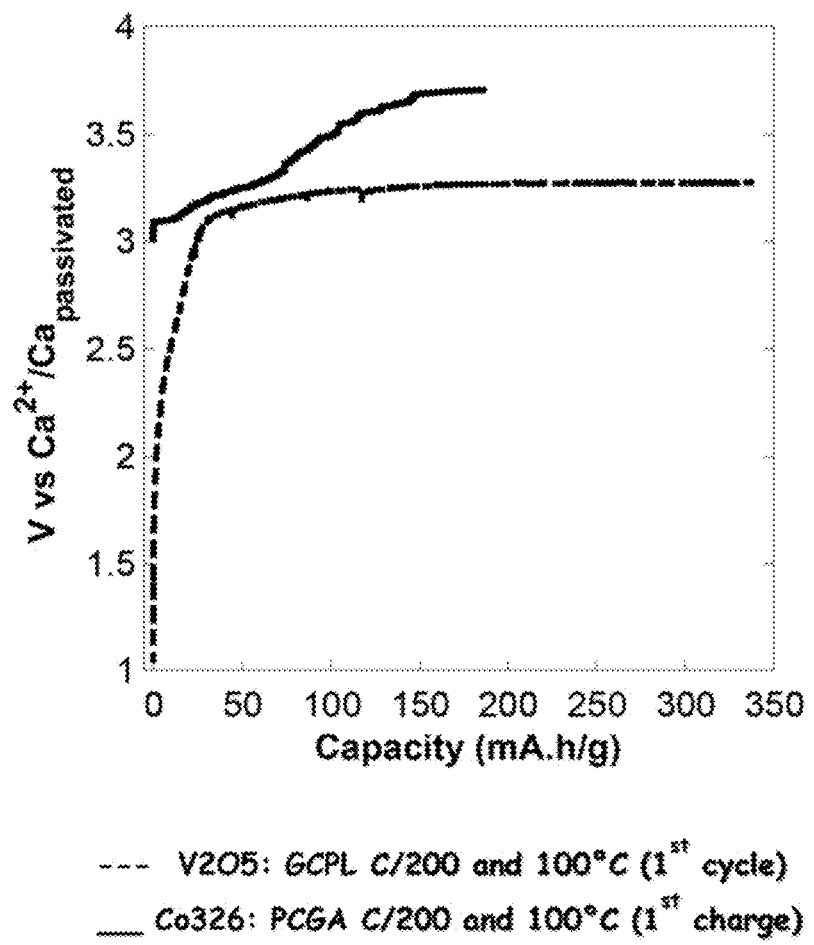
FIG. 8 represents the $1^{st}$ charge of the full $Ca//V_2O_5$ cell prepared according to Comparative Example 2 compared to the $1^{st}$ charge of $Ca//Ca_3Co_2O_6$ full cell of from the present invention.

FIG. 8 represents the 1$^{st}$ charge of the full Ca//V$_2$O$_5$ cell prepared above (in dotted lines), compared to the 1$^{st}$ charge of Ca//Ca$_3$Co$_2$O$_6$ full cell of Example 1 already shown in FIG. 4. The test was performed at 100° C. using a Ca counter electrode in 0.45 M Ca(BF$_4$)$_2$ in EC:PC electrolyte from Solvionic.

V$_2$O$_5$ is used as a reference tested in the same conditions as Ca$_3$Co$_2$O$_6$ in order to demonstrate the advantages of the cell of the invention in terms of higher potential. Indeed, it is clear from FIG. 8 that Ca$_3$Co$_2$O$_6$ has a higher voltage than V$_2$O$_5$.

The following table (Table 3) summarizes properties of the rechargeable batteries described in the present invention as compared to the ones disclosed in the following prior art references discussed above:

TABLE 3

| Type of battery | Positive material structure | Positive material | Molar weight of positive material (mol/g) | Negative material |
|---|---|---|---|---|
| Battery of present invention | 1D | Ca$_{n+2}$Me1$_{(n+1)-y-z}$Me2$_y$Me3$_z$O$_{3n+3}$ | Vary with composition | Ca |
| Ex1 | 1D | Ca$_3$Co$_2$O$_6$ | 334.094 | Ca |
| Ex2 | 1D | Ca$_3$NiMnO$_6$ | 329.859 | Ca |
| Ex3 | 1D | Ca$_3$CoMnO$_6$ | 330.099 | Ca |
| Ex4 | 1D | Ca$_3$CoFeO$_6$ | 331.008 | Ca |
| Ex5 | 1D | Ca$_3$CoNiO$_6$ | 333.854 | Ca |
| Ex6 | 1D | Ca$_3$CoCrO$_6$ | 327.157 | Ca |
| Ex7 | 1D | Ca$_3$Ni$_{0.66}$Mn$_{0.66}$Co$_{0.66}$O$_6$ | 330.121 | Ca |

TABLE 3-continued

| | | | | |
|---|---|---|---|---|
| Ex8 | 1D | $Ca_3Co_{0.5}Cr_{0.5}MnO_6$ | 329.279 | Ca |
| Comparative example 1 | 3D | $Ca_3Co_4O_9$ | 500 | Ca |
| Comparative example | 2D | $V_2O_5$ | 182 | Ca |
| Prior art 1 | 2D | $CaCo_2O_4$ | 222 | $V_2O_5$ |
| Prior art 2 | 1D | $Ca_3Co_2O_6$ | 327.86 | $V_2O_5$ |
| Prior art 3 | NA | CaCoO | NA | $TiS_2$ |
| Prior art 4 | 3D | $CaMn_2O_4$ | 213.95 | Ca |
| Prior art 5 & 6 | 3D | $CaMoO_3$ | 184 | Ca |
| Prior art 7 | 3D | $Ca_2Mo_6Se_8$ | 600.84 | $CaHg_{11}$—CaHg |
| Prior art 8 | 2D | $V_2O_5$ | 182 | Ca |

| Type of battery | Theoretical capacity of positive material (mAh/g-positive material) | Experimental capacity of positive material (mAh/g-positive material) | Experimental average operation voltage of full battery (V) | Operation temperature |
|---|---|---|---|---|
| Battery of present invention | Vary with composition | | | 30° C. ≤ T ≤ 150° C. |
| Ex1 | 240.6508* | 160 | 3.5 | 30° C. ≤ T ≤ 150° C. |
| Ex2 | 243.7405* | NA | NA | 30° C. ≤ T ≤ 150° C. |
| Ex3 | 243.5633* | NA | NA | 30° C. ≤ T ≤ 150° C. |
| Ex4 | 242.8944* | NA | NA | 30° C. ≤ T ≤ 150° C. |
| Ex5 | 240.8238* | NA | NA | 30° C. ≤ T ≤ 150° C. |
| Ex6 | 245.7536* | NA | NA | 30° C. ≤ T ≤ 150° C. |
| Ex7 | 243.5476* | NA | NA | 30° C. ≤ T ≤ 150° C. |
| Ex8 | 243.7519* | NA | NA | 30° C. ≤ T ≤ 150° C. |
| Comparative example 1 | 214 | No $Ca^{2+}$ extraction | No $Ca^{2+}$ extraction | 30° C. ≤ T ≤ 150° C. |
| Comparative example | 295 | No $Ca^{2+}$ extraction | No $Ca^{2+}$ extraction | 30° C. ≤ T ≤ 150° C. |
| Prior art 1 | 241 | 100 | 0.9 | Room temperature |
| Prior art 2 | 180** | NA | 3.2 (EC:PC) 2.7 (DMSO) *** | NA |
| Prior art 3 | NA | NA | NA | Room temperature |
| Prior art 4 | 250 | NA electrolyte decomposition | NA | 75° C. |
| Prior art 5 & 6 | 291 | NA electrolyte decomposition | NA | 100° C. |
| Prior art 7 | NA | 8 | 1.40 | Room temperature |
| Prior art 8 | 295 | NA | NA | 100° C. |

*considering 1.5 Ca out of 3 extracted
**considering 1 Ca out of 3 extracted
*** Not based on actual data (no curve)

The invention claimed is:

1. A calcium-based secondary cell comprising:
a negative electrode that includes a negative-electrode active material, said negative-electrode active material being capable of accepting and releasing calcium ions,
a positive electrode that includes a positive-electrode active material, said positive-electrode active material being capable of accepting and releasing calcium ions,
an electrolyte arranged between the negative electrode and the positive electrode and comprising a calcium salt of a fluorine-containing anion of formula $(XF_n)^{m-}$ wherein n is a positive integer of at most 6 and m is a positive integer of at least 1 and m<n,
wherein the positive-electrode active material is a one-dimensional structure accommodating $Ca^{2+}$ ions and has the formula (1):

$$Ca_{n+2}Me1_{(n+1)-y-z}Me2_yMe3_zO_{3n+3} \quad (1)$$

wherein, in formula (1):
Me1, Me2, Me3 are different transition metals;
1≤n and n is not necessarily an integer;
0≤y and y is not necessarily an integer;
0≤z and z is not necessarily an integer,
wherein the negative electrode comprises from 50 weight % to 100 weight % of metallic calcium or a calcium alloy according to the formula (I) when a total weight of the negative electrode is 100 weight %:

$$Ca_mB \quad (I)$$

wherein, in Formula (I), m is 0≤m≤3, and B is a metal or a semi-conductor element.

2. The calcium-based secondary cell according to claim 1, wherein the central atom X, in the anion part of the calcium salt of a fluorine-containing anion, is a three- to six-valent atom from one of groups 13 to 16 of the Periodic Table.

3. The calcium-based secondary cell according to claim 1, wherein the calcium salt of a fluorine-containing anion is $Ca(BF_4)_2$ and/or $Ca(PF_6)_2$.

4. The calcium-based secondary cell according to claim 1, wherein Me1, Me2 and Me3 are each independently chosen among Ni, Mn, Co, Cr and Fe.

5. The calcium-based secondary cell according to claim 1, wherein y and z are not both zero at the same time.

6. The calcium-based secondary cell according to claim 5, wherein the positive-electrode active material is a one-dimensional structure having a formula chosen in the group consisting of: $Ca_3NiMnO_6$; $Ca_3CoMnO_6$; $Ca_3CoFeO_6$; $Ca_3Co_{0.5}Fe_{0.5}MnO_6$; $Ca_3CrNiO_6$; $Ca_6Co_3NiCrO_{15}$; and $Ca_6Co_2N_{12}MnO_{15}$.

7. The calcium-based secondary cell according to claim 1, wherein y and z are both zero at the same time.

8. The calcium-based secondary cell according to claim 7, wherein the positive-electrode active material is a one-dimensional structure having a formula chosen in the group consisting of: $Ca_3Co_2O_6$; $CaCoO_3$.

9. The cell according to claim 1, wherein the negative electrode material is a calcium metal anode.

10. The cell according to claim 1, wherein the calcium-based secondary cell includes a positive current collector, and the positive current collector is based on aluminum.

11. The cell according to claim 1, wherein the electrolyte contains a mixture of ethylene carbonate (EC) and propylene carbonate (PC).

12. The cell according to claim 1, wherein the cell further comprises a temperature control element.

13. The cell according to claim 1, wherein the negative electrode comprises from 65 weight % to 100 weight % of the metallic calcium or the calcium alloy.

14. The cell according to claim 1, wherein the negative electrode comprises from 75 weight % to 100 weight % of the metallic calcium or the calcium alloy.

15. The cell according to claim 1, wherein the negative electrode active material consists of the metallic calcium or the calcium alloy.

16. The cell according to claim 1, wherein the negative electrode active material is the calcium alloy, and the calcium alloy comprises $Ca_xSn_y$ or $Ca_xSi_y$ and $0 \leq x \leq 2$.

17. The cell according to claim 13, wherein the negative electrode active material is the calcium alloy, and the calcium alloy comprises $Ca_xSn_y$ or $Ca_xSi_y$ and $0 \leq x \leq 2$.

18. A non-aqueous calcium-based secondary battery comprising a calcium-based secondary cell according to claim 1.

19. A vehicle, an electronic device, a robot, a wheelchair, an autonomous drone or a stationary power generating device comprising a non-aqueous calcium-based secondary battery according to claim 18.

* * * * *